US008064179B2

(12) United States Patent
Apfel (10) Patent No.: US 8,064,179 B2
(45) Date of Patent: Nov. 22, 2011

(54) INTEGRATED CIRCUIT INCLUDING A SWITCHING REGULATOR DESIGN FOR POWER OVER ETHERNET DEVICES

(75) Inventor: Russell J. Apfel, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 519 days.

(21) Appl. No.: 11/515,569

(22) Filed: Sep. 5, 2006

(65) Prior Publication Data

US 2008/0062586 A1    Mar. 13, 2008

(51) Int. Cl.
*H02H 3/20* (2006.01)
(52) U.S. Cl. .......................................................... 361/90
(58) Field of Classification Search .................... 361/91, 361/90
See application file for complete search history.

(56) References Cited

U.S. PATENT DOCUMENTS

| | | | | |
|---|---|---|---|---|
| 4,278,985 | A * | 7/1981 | Stobbs | 257/477 |
| 2001/0015639 | A1* | 8/2001 | Aas et al. | 323/282 |
| 2006/0215680 | A1* | 9/2006 | Camagna | 370/419 |
| 2007/0086129 | A1* | 4/2007 | Vos et al. | 361/56 |
| 2007/0189495 | A1* | 8/2007 | Crawley et al. | 379/323 |

OTHER PUBLICATIONS

LTC4267: Power over IEEE 802.3af PD Interface with Integrated Switching Regulator, Linear Technology Cooperation, 2004.*
Doug Dickinson, LTC News for Immediate Release: Power over Ethernet PD Controller with Onboard Switching Regulator Provides Smallest Overall Solution (LTC4267); Linear Technology Cooperation; Nov. 1, 2004.*
National Semiconductor, "LM5070 Integrated Power Over Ethernet PD Interface and PWM Controller", www.national.com, Nov. 2004, 16 pages.
John Jovalusky, "DPA-Switch Integrates Multiple Power Supply Functions in Single Chip", Switching Power Magazine, 2004, 5 pages, vol. 5, Issue 4.
Texas Instruments, "Integrated 100-V IEEE 802.3af PD and DC/DC Controller", www.ti.com, Aug. 2005, 37 pages.
Mark Gurries, "Simple Battery Circuit Extends Power over Ethernet (PoE) Peak Current—Design Note 361", Linear Technology, 2 pages, 2005.
"USB Power Controller and Li-Ion Linear Charger", Linear Technology, 24 pages, 2004.
"Power over Ethernet IEEE 802.3af PD Interface with Integrated Switching Regulator", Linear Technology, 32 pages, 2004.
Ka Leung, "Optimizing System Operation Using a Flexible Digital PWM Controller", Silicon Laboratories Inc., 6 pages.
Don Alfano, "A Versatile Monolithic Digital PWM Controller", Silicon Laboratories Inc., 5 pages.
Amir Lehr, "Powering the Converged Network: An Analysis of the Power over LAN Standard and Implications", www.powerdsine.com, 8 pages.

* cited by examiner

*Primary Examiner* — Rexford Barnie
*Assistant Examiner* — Nicholas Ieva
(74) *Attorney, Agent, or Firm* — Polansky & Associates, P.L.L.C.; Ronald Michael Reed (57) ABSTRACT

A powered device includes an interface that is responsive to a powered network and an integrated circuit device that is coupled to the interface to receive power and data from the powered network. The integrated circuit device includes a power rectification and protection device to generate a rectified power supply related to the power received from the interface, a switching regulator to selectively activate a switched power supply to associated load circuitry, and a power over Ethernet (PoE) controller. The PoE controller controls the switching regulator to provide the switched power supply to the associated load circuit when the rectified power supply is within an operating range.

18 Claims, 7 Drawing Sheets

INTEGRATED CIRCUIT INCLUDING A SWITCHING REGULATOR DESIGN FOR POWER OVER ETHERNET DEVICES

FIELD OF THE DISCLOSURE

The present disclosure is generally related to powered devices in Power over Ethernet networks, and more particularly to powered devices including an integrated circuit with a switching regulator.

BACKGROUND

Power over Ethernet (PoE), which is outlined in IEEE Std 802.3™-2005 clause 33 (the PoE standard), refers to a technique for delivering power and data to an electronic device via a network cable, such as a twisted pair Ethernet cable. Typically, a PoE system includes power sourcing equipment (PSE) to provide a power supply via Ethernet cabling to one or more electronic device, which may be referred to as powered devices. PoE reduces the need for a separate power source to deliver power to attached powered devices. Such powered devices may include voice over Internet protocol (VoIP) telephones, wireless routers, security devices, field devices to monitor process control parameters, data processors, and the like.

Generally, the PoE standard specifies that a powered device include a PoE compatible control device and a switch regulator device that takes a voltage supplied by the network cable (e.g. 36 to 57 Volts) and reduces the received voltage to a lower voltage level for use by circuit components of the powered device. For example, the lower voltage level may be within a range of 1.2 to 5 Volts.

Conventionally, powered devices utilize a PoE controller that is coupled to external diode bridges and external voltage protection devices. The PoE controller may be protected using external over-voltage or surge protection circuitry, but over-voltage conditions may still appear at an input of the switching regulator. To prevent breakdown due to over-voltage conditions, a high-voltage external switch may be used, which may have a high turn-on voltage, but which may increase the overall power consumption of the powered device.

Therefore, there is a need for an improved integrated circuit with a switching regulator and with PoE functionality.

SUMMARY

In a particular illustrative embodiment, a powered device is provided that includes an interface that is responsive to a powered network and an integrated circuit device that is coupled to the interface to receive power and data from the powered network. The integrated circuit device includes a power rectification and protection device to generate a rectified power supply related to the power received from the interface, a switching regulator to selectively activate a switched power supply to associated load circuitry, and a power over Ethernet (PoE) controller. The PoE controller controls the switching regulator to provide the switched power supply to the associated load circuit when the rectified power supply is within an operating range.

In another particular embodiment, an integrated circuit of a Power over Ethernet (PoE) powered device is provided that includes a power circuit device, an integrated hot swap switch, a switching regulator, and a PoE detection and classification circuit. The power circuit device is responsive to a powered network to receive a power supply and to generate a rectified power supply related to the power supply. The integrated hot swap switch is coupled to the power circuit device to detect the powered network and to selectively activate current to a supply terminal in response to detection of the powered network. The switching regulator includes a switching regulator driver and a switching regulator controller to selectively activate a switch to provide a regulated power supply to a pair of supply terminals. The PoE detection and classification circuit is coupled to the power circuit device to generate a detection signature in response to a PoE detection process and to generate a classification signature responsive to a PoE classification process.

DETAILED DESCRIPTION OF THE DRAWINGS

In general, a fully integrated powered device is provided to receive power and data from a powered network. As used herein, the term "powered network" refers to a system that delivers power and data on a network cable, which may be comprised of one or more wires. A powered device is an electronic device that is adapted to derive power and to receive data from such a powered network via the network cable.

In a particular embodiment, the powered device includes an integrated circuit having power over Ethernet (PoE) protocol circuitry, an on-chip diode bridge and voltage protection device, and a coordinated powered device controller and switching regulator. Generally, circuit components are rated to indicate a power level to which they may operate reliably. To prevent the input power supply from exceeding such a power rating, a surge protector or over-voltage protection circuit may be included. When a voltage is received that exceeds a voltage threshold (that is preferably less than the power rating), an over-voltage fault condition is detected, and the voltage protection device is activated. The powered device controller may also deactivate the switching regulator. In a particular embodiment, excess voltage from the over-voltage fault condition may be shared between a hot swap switch and the switching regulator to distribute the power dissipation across several components, allowing a circuit designer to use devices with lower breakdown voltage ratings. Moreover, the powered device controller and switching regulator provides a soft-start interface and controls a power supply to the various components so that power is applied only when the correct conditions for operation of the device are present.

The integrated powered device controller and switching regulator may be used in a buck regulator configuration, which has a reduced inductive voltage flyback signal, such that a breakdown voltage of a switch of the switching regulator may be reduced. Additionally, the buck regulator configuration allows for a size of the switch device (and its associated current capacity) to be adjusted to account for additional current, without increasing the costs associated with increasing a maximum breakdown voltage. Additionally, the buck regulator configuration uses an inductor as opposed to a transformer and may use a smaller output capacitor than the output capacitor that is used in a flyback configuration, which may result in additional cost savings.

Figure 1:
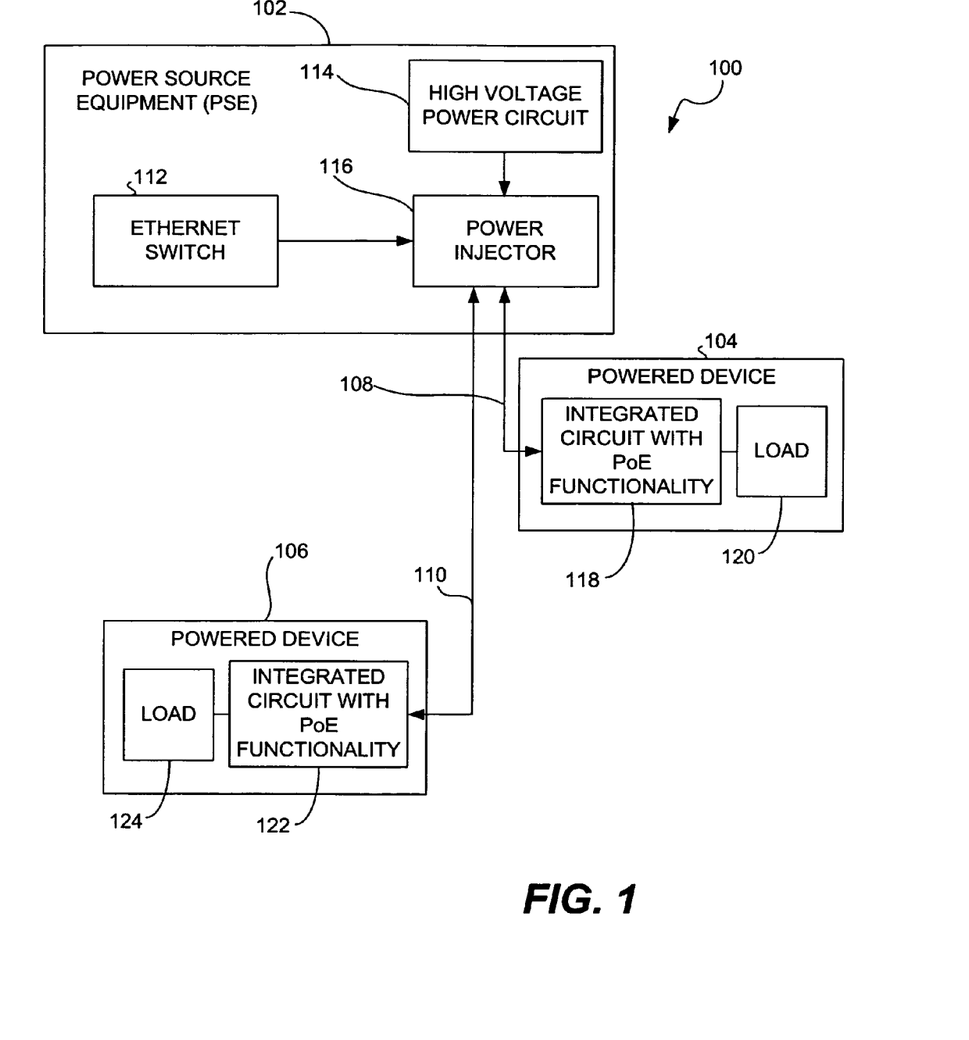
FIG. 1 is a block diagram of an illustrative embodiment of a power over Ethernet (PoE) system including a powered device having an integrated circuit with PoE functionality.

FIG. 1 is a block diagram of an illustrative embodiment of a power over Ethernet (PoE) system 100. The system 100 includes power sourcing equipment (PSE) 102 and powered devices 104 and 106, which are coupled to the PSE 102 by network cables 108 and 110, respectively. The PSE 102 includes an Ethernet switch 112, a high voltage power circuit 114, and a power injector 116. The power injector 116 receives data from the Ethernet switch 112 and receives a power supply from the high voltage power circuit 114. The power injector 116 may provide both power and data to the powered devices 104 and 106 via the network cables 108 and 110, respectively.

The powered device 104 may include an integrated circuit with power over Ethernet (PoE) functionality 118 coupled to a load circuit 120. The powered device 106 may include an integrated circuit with power over Ethernet (PoE) functionality 122 coupled to a load circuit 124. In general, the integrated circuits with power over Ethernet (PoE) functionality 118 and 122 are adapted to connect to the network cables 108 and 110 via a network interface, such as an RJ-45 Ethernet connector, to receive a power supply and to provide a regulated power supply to the associated load circuits 120 and 124.

In a particular embodiment, the network cables 108 and 110 may be twisted pair Ethernet cables, including four wire pairs that may be used to carry both power and data. In a particular embodiment, the PSE 102 may be a mid-span device adapted to inject power onto an Ethernet cable between a standard Ethernet switch and a powered device, such as the powered devices 104 or 106.

Figure 2:
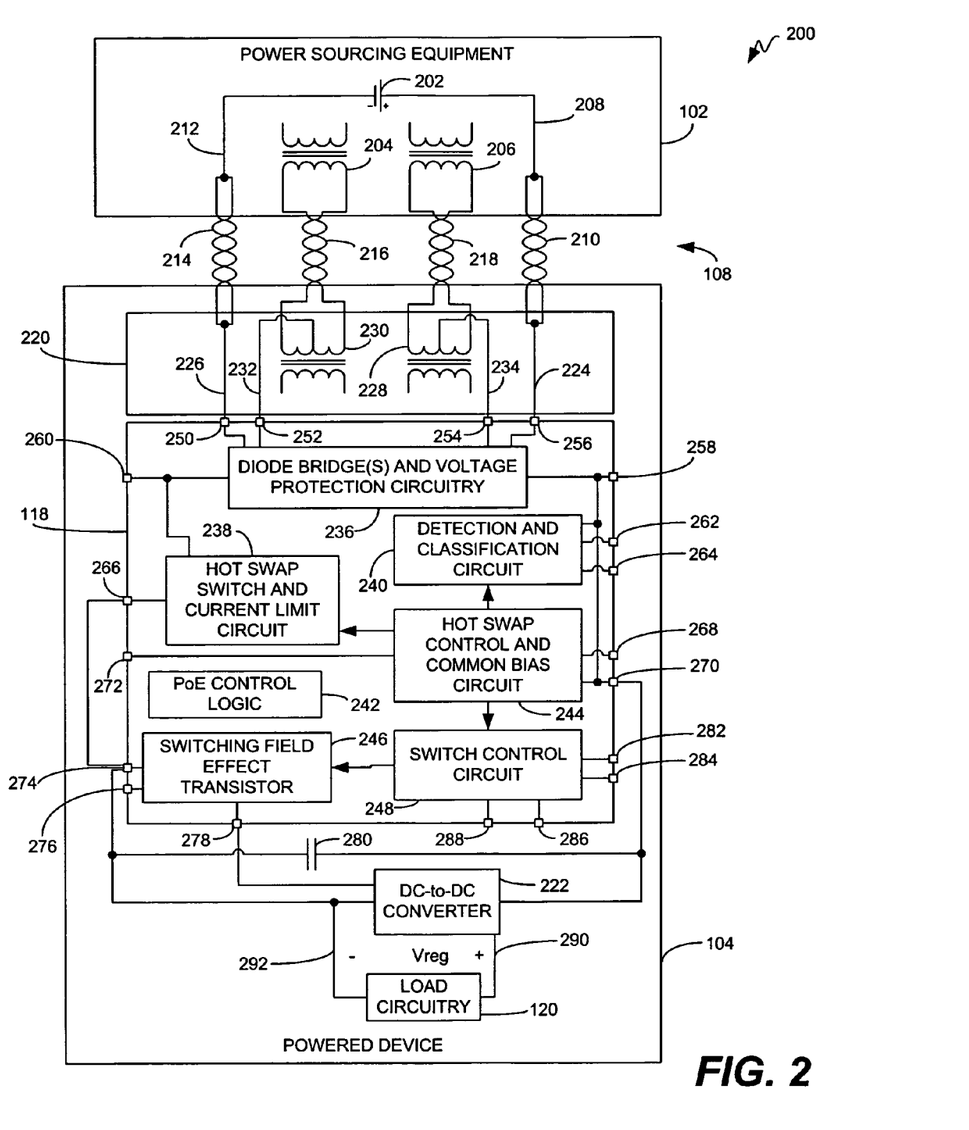
FIG. 2 is a general diagram of the PoE system of FIG. 1 including a powered device with a particular illustrative embodiment of an integrated circuit with PoE functionality.

FIG. 2 is an expanded diagram of a particular illustrative embodiment of a PoE system 200, including the PSE 102 and the powered device 104 having a particular illustrative embodiment of the integrated circuit with PoE functionality 118. The PSE 102 includes a voltage supply source 202 (such as the high voltage power circuit 114 of FIG. 1) and a pair of transformers 204 and 206. The voltage supply source 202 may include a positive terminal 208 coupled to a wire pair 210 of the network cable 108. The voltage supply source 202 may also include a negative terminal 212 coupled to a wire pair 214 of the network cable 108. In this particular embodiment, the wire pairs 210 and 214 may be referred to as spare wire pairs or spare pairs (SPs), because they carry only a power supply. The transformer 204 may be coupled to a wire pair 216, and the transformer 206 may be coupled to a wire pair 218. The wire pairs 216 and 218 may carry power, data, or any combination thereof.

The powered device 104 may include a network interface 220, such as an RJ-45 connector. The powered device 104 may also include an integrated circuit 118 with power over Ethernet (PoE) functionality, a switched voltage regulator, such as a direct current-to-direct current (DC-to-DC) converter 222, and load circuitry 120. The network connector 220 may include a first input terminal 224 coupled to the wire pair 210 and a second input terminal 226 coupled to the wire pair 214. The network connector 220 may also include a first transformer 228 that is coupled to the wire pair 216 and a second transformer 230 that is coupled to the wire pair 218. The first transformer 228 may include a center tap terminal 234, and the second transformer 230 may include a center tap terminal 232.

The integrated circuit 118 may include one or more diode bridges and voltage protection circuitry 236, a hot swap switch and current limit circuit 238, a power over Ethernet (PoE) detection and classification circuit 240, power over Ethernet (PoE) control logic 242, a hot swap control and common bias circuit 244, a switching field effect transistor 246, and a switch control circuit 248. The one or more diode bridges and voltage protection circuitry 236 may be coupled to the second input terminal 226 via a pin 250, to the center tap terminal 232 via a pin 252, to the center tap terminal 234 via a pin 254, and to the first input terminal 224 via a pin 256. The diode bridges and voltage protection circuitry 236 may provide a rectified power supply to a positive voltage supply (VPOS) pin 258 and to a negative power supply (VNEG) pin 260. The detection and classification circuit 240 may be coupled to the VPOS pin 258, to a power over Ethernet (PoE) detection pin 262, and to a PoE classification pin 264. The hot swap switch and current limit circuit 238 is coupled to the VNEG pin 260, to a hot swap output (HSO) pin 266, and to the hot swap control and common bias circuit 244. The hot swap switch and current limit circuit 238 may be responsive to control signals from the hot swap control and common bias circuit 244 to selectively couple an electrical potential on the VNEG pin 260 to the HSO pin 266.

The hot swap control and common bias circuit 244 may be coupled to a soft-start output pin 268, to the VPOS pin 258 via a voltage supply (VDD) pin 270, and to a power loss (PLOSS) pin 272. In a particular embodiment, the hot swap control and common bias circuit 244 may receive an input (from a power loss detector, such as the power loss detector 606 of FIG. 6) indicative of a power supply at one or more of the pins 250, 252, 254, and 256 and may generate a power loss indicator to the PLOSS pin 272 when the power supply falls below a predetermined threshold. Additionally, the hot swap control and common bias circuit 244 may generate a control signal to activate a switching regulator, including the switch control circuit 248, when the input voltage supply is within an operating range (such as between 36 volts and 57 volts), and to deactivate the switching regulator when the input voltage supply falls below 32 volts or when the input voltage exceeds a voltage threshold. Other circuitry may be coupled to the PLOSS pin 272 to detect the power loss indicator and to initiate a shut down operation to power down associated circuitry gracefully before the rectified power supply across the VPOS pin 258 and the VNEG pin 260 falls below an operating power level of the powered device 104.

The switching field effect transistor (FET) 246 may be coupled to a first voltage switched supply (VSS1) pin 274, to a second voltage switched supply (VSS2) pin 276, and to a switched output pin 278. The switching FET 246 provides a switched power supply (a negative supply) to the VSS1 and VSS2 pins 274 and 276, which may be coupled to external devices, such as an input filter capacitor 280 and the DC-to-DC converter 222. The switch control circuit 248 may be adapted to selectively activate the switching field effect transistor 246 to control the DC-to-DC converter 222. The switch control circuit 248 may also be coupled to a snubber pin 282, to a current limit selector (RIMAX) pin 284, to an error amplifier output (EAO) pin 286 (which may be directly coupled to an optical coupler in an isolated application, such as the optically coupled isolator 534 in FIG. 5), and to a feedback pin 288 (in a non-isolated application). The DC-to-DC converter 222 is coupled to the VDD pin 270, to the SWO pin 278 and to VSS1 pin 274 to receive a rectified power supply and to provide a regulated power supply to load circuitry 120 via regulated power supply terminals 290 and 292.

In general, the integrated circuit 118 integrates functionality that is used by powered devices in a power over Ethernet environment as specified by the PoE standard. A high voltage power supply (e.g. 36-57 volts) received from the network cable 108 may be rectified by the diode bridges and voltage protection circuitry 236 and may be provided to the VPOS pin 258 end the VNEG pin 260. If a voltage level at the pins 250, 252, 254, and 256 is within an operating range for the powered device 104, the hot swap switch and current limit circuit 238 may electrically couple the VNEG pin 260 to one of the VSS1 pin 274 and the VSS2 pin 276 to complete an electrical circuit, for example, with the DC-to-DC converter 222, which is external to the integrated circuit 118.

In general, the particular arrangement of elements of the integrated circuit 118 reduces the footprint of circuitry to perform functions specified by the PoE standard. Moreover, the integrated circuit 118 reduces the number of external components and allows for internal components of the integrated circuit and external components coupled to the integrated circuit to have a lower voltage rating than might otherwise be permissible. For example, since the integrated circuit 118 is adapted to provide over-voltage protection and since the DC-to-DC converter 222 derives its supply voltage from the integrated circuit 118, an over-voltage at the inputs (e.g. pins 250, 252, 254, and 256) may be reduced by the integrated circuit 118 before the voltage appears at the inputs to the DC-to-DC converter 222, allowing a circuit designer to utilizes components having a power rating that matches the output of the integrated circuit 118 rather than devices rated for the higher voltage that may appear at the inputs to the integrated circuit 118. Thus, integration of the various elements reduces costs while maintaining a high performance standard. By integrating the diode bridges and voltage protection circuitry 236 onto the integrated circuit 118, the integrated circuit 118 may be connected directly to the network interface 220 (e.g. via an RJ-45 connector, for example). Additionally, integration of the switch control circuit 248 and the switching FET 246 allows the integrated circuit 118 to support both isolated flyback and non-isolated buck converter (regulator) topologies. Specifically, the pins 286, 288 and 278 of the integrated circuit 118 allow the integrated circuit to be used with a DC-to-DC converter 222, which may be a transformer winding or a buck regulator, for example. By utilizing a feedback pin, such as the feedback pin 288, a transformer may be utilized such that a primary winding of the transformer is coupled between the VDD pin 270 and the feedback pin 288 to control the primary winding and to isolate the switching field effect transistor 246 from inductive voltage kick events. In a particular embodiment, the switch control circuit 248 may be adapted to direct excess voltage at the feedback pin 288 to a snubber circuit (not shown) to prevent excess voltage from discharging through the switching field effect transistor 246.

In a particular embodiment, by integrating the diode bridges and over-voltage protection circuitry 236, early power loss detection can also be implemented that utilizes a delay provided by the diode circuit and filter capacitances to provide a window of time in which to perform a controlled shutdown of the powered device and associated load circuitry. In a particular embodiment, the integrated circuit 118 may be implemented as a low-profile, 20-pin, 5×5 mm circuit package. Additionally, in a particular embodiment, the detection and classification circuit 240 may be programmable.

Figure 3:
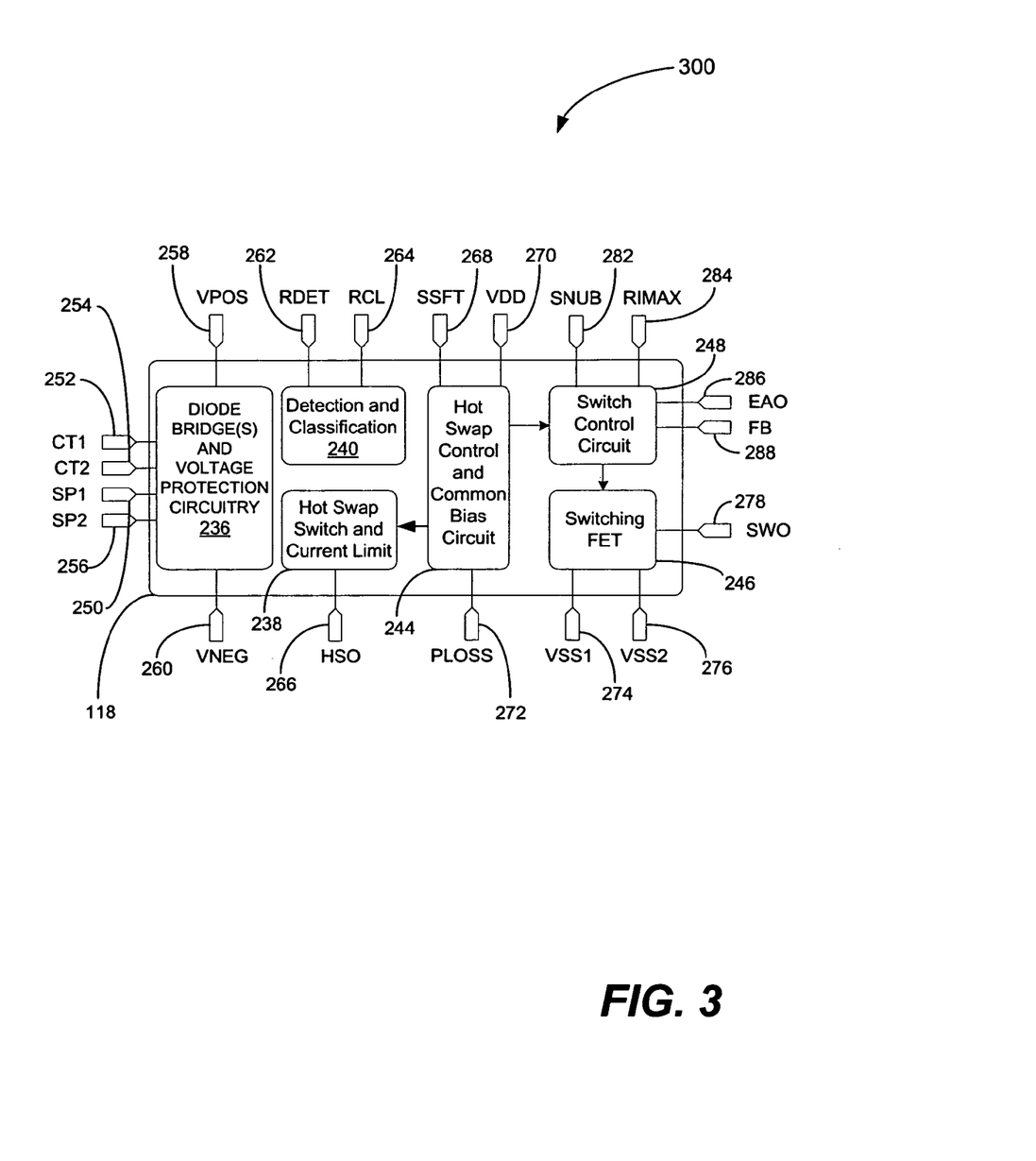
FIG. 3 is a block diagram of a particular illustrative embodiment of an integrated circuit with PoE functionality.

FIG. 3 is a block diagram of a particular illustrative embodiment of an integrated circuit 300, such as the integrated circuit 118 of FIG. 1, with PoE functionality. The integrated circuit 300 includes a diode bridges and voltage protection circuitry 236, a detection and classification circuit 240, a hot swap switch and current limit circuit 238, a hot swap control and common bias circuit 244, a switch control circuit 248, and a switching field effect transistor (FET) 246. The diode bridges and voltage protection circuitry 236 may be coupled to a powered network via a first center tap (CT1) pin 252, a second center tap (CT2) pin 254, a first spare wire (SP1) pin 250, a second spare wire (SP2) pin 256, or any combination thereof. The diode bridges and voltage protection circuitry 236 is responsive to the CT1 pin 252, the CT2 pin 254, the SP1 pin 250, and the SP2 pin 256 to receive an input power supply and to generate a rectified power supply to the VPOS pin 258 and to the VNEG pin 260. The classification and detection circuit 240 may be coupled to a PoE resistance detection (RDET) pin 262 and a PoE classification (RCL) pin 264. The hot swap switch and current limit circuit 238 may be coupled to the hot swap output (HSO) pin 266. The hot swap control and common bias circuit 244 may be coupled to the soft start output (SSFT) pin 268, the VDD pin 270, and the power loss (PLOSS) pin 272. The SSFT pin 268 allows the voltage to be ramped up slowly across an external soft-start capacitor (such as capacitor 412 in FIG. 4) to allow the switch control to ramp the output slowly.

The switch control circuit 248 may be coupled to a snubber pin 282, a current limit select (RIMAX) pin 284, an error amplifier output (EAO) pin 286, and a feedback pin 288. The switching FET 246 is coupled to a switching output (SWO) pin 278 and to first and second voltage supply terminals (VSS1 and VSS2) 274 and 276, respectively.

In general, the integrated circuit 118 may include a dual level input current limit. In a particular embodiment, the hot swap switch and current limit circuit 238 may receive a power level indication from, for example, a power loss detector 606, and may deactivate a current flow when the power level falls below an on-threshold level and when the power level exceeds a power threshold. At power up, before a capacitor (such as capacitor 408 in FIG. 4) that is coupled to the hot swap output (HSO) pin 266 is charged, the current limit of the integrated circuit 118 is set at a current inrush level. After the HSO capacitor has been charged to a voltage level that is within approximately 1.25 volts of a voltage potential on the VNEG pin 260, the hot swap control and common bias circuit 244 is adapted to engage the current limit of the hot swap switch and current limit module 238 to provide a higher operating current. This higher operating current remains active via the hot swap switch and current limit module 238 until a power level at the pins 250, 252, 254, and 256 falls below a low power threshold or until a current increases enough to cause a fold back of a voltage on the HSO pin 266. In general, an operating mode of the switch control circuit 248 may be configured using the RIMAX pin 284 to specify whether the DC-to-DC converter configuration (e.g. isolated configuration as provided by the transformer 502 in FIG. 5 or non-isolated configuration as provided by the buck regulator configuration of FIG. 4). When the DC-to-DC converter is a transformer, the RIMAX pin 284 is left floating. When the DC-to-DC converter is a buck regulator, the RIMAX pin 284 is coupled to the VDD pin 270.

Figure 4:
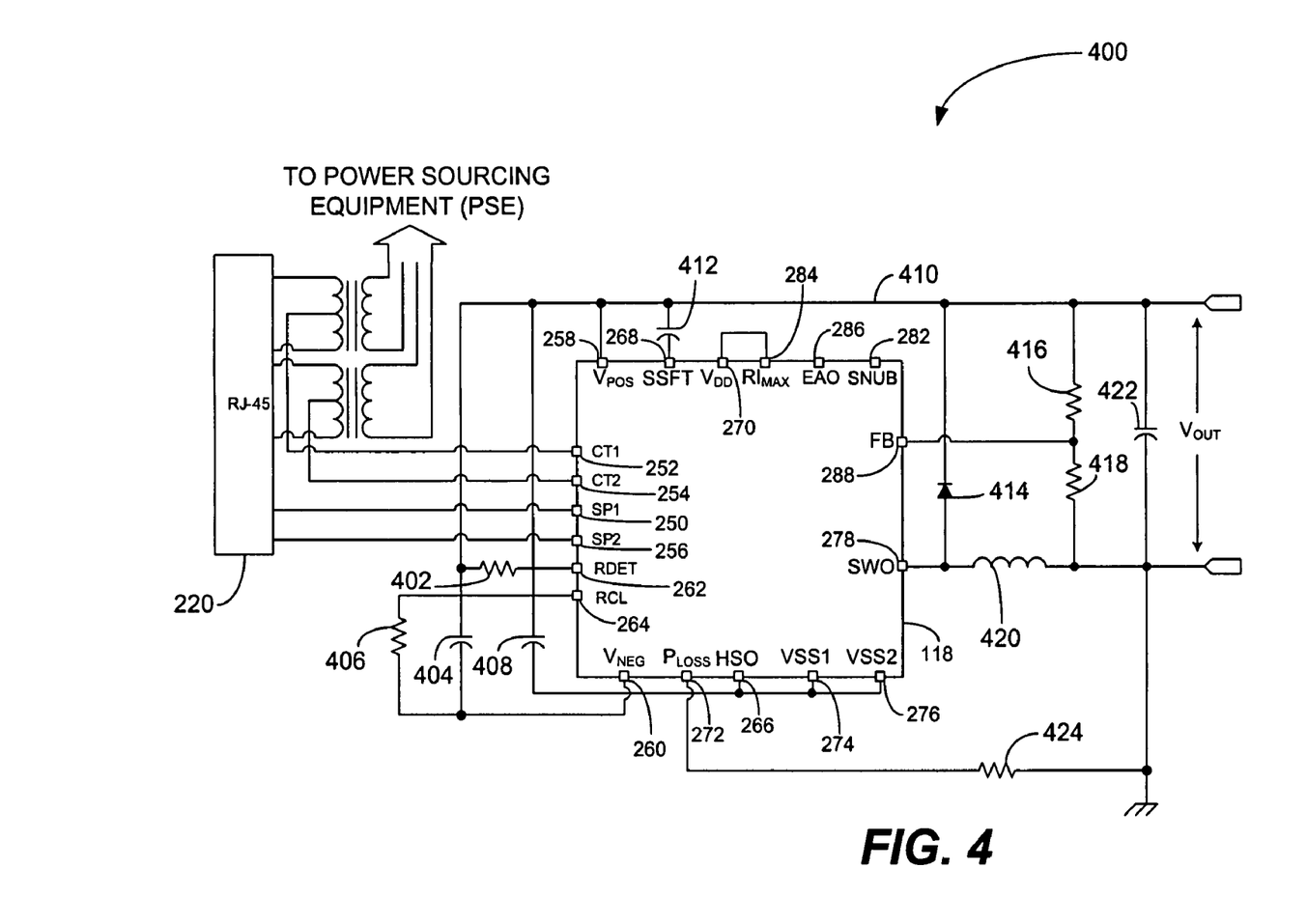
FIG. 4 is a circuit diagram of a particular illustrative embodiment of an integrated circuit of a powered device adapted to provide a non-isolated power supply to associated load circuitry.
Figure 7:
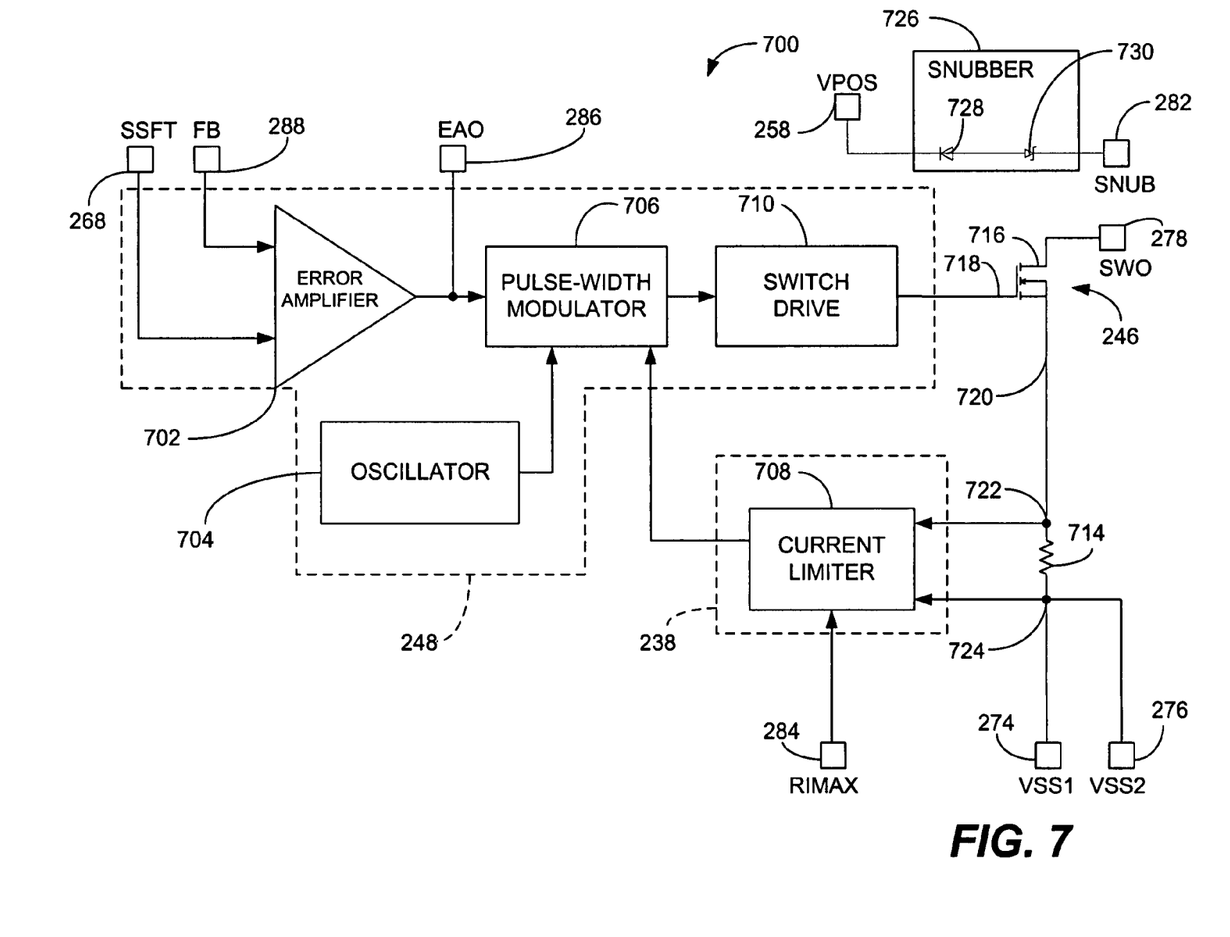
FIG. 7 is a block diagram of switching regulator components of a particular illustrative embodiment of the integrated circuits with PoE functionality as illustrated in FIGS. 1-5.

In general, non-isolated configurations may be utilized when the powered device is self-contained and does not provide external conductors to a user or to another application. Non-isolated applications may be used in power devices that do not include external conductors or connections to external devices. For example, non-isolated configurations may include security cameras, wireless access points, and the like. By contrast, an isolated system may be used when the powered device interfaces with other self-powered equipment or when the powered device has external conductors accessible to the user or to other applications. In an isolated system, the regulated output power supply should have no DC electrical path to the hot swap interface (such as the hot swap switch and current limit 238, the hot swap control and common bias circuit 244 or the switch control circuit 248). The RIMAX pin 284 (as shown in FIG. 7) may provide an input to a current limiter circuit to FIG. 4 is a circuit diagram of a particular illustrative embodiment of an integrated circuit device 400 that may be used within a powered device and that is adapted to provide a non-isolated power supply to associated load circuitry. The integrated circuit device 400 provides a non-isolated power supply by utilizing a switched inductor in a buck regulator configuration without a transformer. Use of a transformer (as shown in the circuit device 500 of FIG. 5) provides power supply isolation.

The circuit device 400 includes a network interface 220 that may be coupled to power sourcing equipment via a network cable. The integrated circuit 118 is coupled to the network interface 220 to receive power and data via the CT1 pin 252, the CT2 pin 254, the SP1 pin 250, the SP2 pin 256, or any combination thereof. The PoE resistance detection (RDET) pin 262 may be coupled to the negative power supply (VNEG) pin 260 via a detection resistor 402 and an input supply capacitor 404. The PoE resistance classification (RCL) pin 264 may be coupled to the VNEG pin 260 via a classification resistor 406. The hot swap output (HSO) pin 266, the VSS1 pin 274 and the VSS2 pin 276 may be coupled to a voltage supply terminal 410 via a switcher supply capacitor 408. The VPOS pin 258 may be coupled to the voltage supply terminal 410. The SSFT pin 268 may be coupled to the voltage supply terminal 410 via a soft-start charge up capacitor 412. The VDD pin 270 and the RIMAX pin 284 may be connected to establish a switching operation mode to a non-isolated mode. By connecting the RIMAX pin 284 to the VDD pin 270 as shown (or by typing the RIMAX pin 284 to the VPOS pin 258), a current limit of the switching field effect transistor 246 is selected to establish a current limit for the device to limit a current flow to external components. By floating the RIMAX pin 284, the current limit may be a default limit that is limited to a range below a voltage rating of the switching field effect transistor 246. By coupling the RIMAX pin 284 to the VDD pin 270, the current limit may be set to a current limit that is less than 400 mA, for example.

The switching field effect transistor output (SWO) pin 278 may be coupled to the voltage supply terminal 410 via a diode 414. The feedback (FB) pin 288 may be coupled to a midpoint of a voltage divider including a first feedback resistor 416 and a second feedback resistor 418. The first feedback resistor 416 may include a first terminal coupled to the voltage supply terminal 410 and a second terminal coupled to the second feedback resistor 418, which may be coupled to the SWO pin 278 via an inductor 420. A switcher load capacitor 422 may be coupled to the voltage supply terminal 410 and coupled to the SWO pin 278 via the inductor 420. The switcher load capacitor 422 may also be coupled to the power loss (PLOSS) pin 272 via a resistor 424.

In a particular illustrative non-limiting embodiment, the detection resistor 402 may have a resistance value of approximately 25.5 k Ω with a tolerance of approximately 1% and a power rating of approximately ⅛th of a watt. The input supply capacitor 404 may have a capacitance of approximately 0.1 micro-Farads (μF). The classification resistor 406 may have a resistance of approximately 48.7Ω with an error tolerance of approximately 1% and a power rating of approximately ⅛th of a watt. The switcher supply capacitor 408 may be a 100 μF capacitor having a tolerance of approximately 10% and a voltage rating of approximately 100 volts. The soft-start charge up capacitor 412 has a capacitance of approximately 100 nF with a tolerance of approximately 20% and a voltage rating of approximately 100 volts. The diode 414 may be a Schottky diode (part no. UPS840). The first feedback resistor may be a 267 kΩ resistor with a tolerance of approximately 0.1% and a power rating of approximately ⅛th of a watt. The second feedback resistor 418 may be a 732 kΩ resistor with a tolerance of approximately 0.1% and a power rating of approximately ⅛th of a watt. The resistor 424 may be a 976 kΩ resistor with a 1% tolerance and a power rating of approximately ⅛th of a watt.

In operation, the integrated circuit 118 in cooperation with the resistors 402, 406, 416, 418, and 424, with the capacitors 404, 408, 412 and 422, and with the diode 414 and the inductor 420 provide a non-isolated power supply to associated load circuitry. In a particular embodiment, the non-isolated power supply may be a 5 volt supply. In general, this non-isolated topology uses a single inductor 420 as the energy conversion element. In general, the hot swap control and common bias circuit 244 (such as that shown in FIG. 2) changes its mode of operation based on an input voltage applied to the CT1 pin 252, the CT2 pin 254, the SP1 pin 250, and the SP2 pin 256.

An example of a set of operating modes is shown in TABLE 1 below.

TABLE 1

Hot Swap Control Operating Modes.

| INPUT VOLTAGE (CT1 and CT2 or SP1 and SP2) | Operating Mode |
| --- | --- |
| 0 volts to 2.5 volts | Inactive |
| 2.6 volts to 11 volts | PoE Detection Signature |
| 11 volts to 14 volts | Detection turns off and internal bias starts |
| 14 volts to 22 volts | PoE Classification Signature |
| 22 volts to 25 volts | Transition Region |
| 25 volts to 29 volts | Power indicator (PLOSS) enabled |
| 29 volts to 39 volts | Transition region |
| 39 volts to 57 volts | Switch Control operating mode (hysteresis limit based on rising input voltage) |
| 57 volts to 32 volts | Switch Control operating mode (hysteresis limit based on falling input voltage) |

Thus, the integrated circuit 118 receives an input voltage via at least one of the CT1 pin 252, the CT2 pin 254, the SP1 pin 250, and the SP2 pin 252. When the input voltage is between 2.6 and 11 volts, the integrated circuit 118 applies a voltage to the RDET pin 262 to bias the resistor 402 relative to a voltage level of the VNEG pin 260 to provide a PoE detection signature to power sourcing equipment via the network interface 220. After the detection signature has been applied for a period of time, the power sourcing equipment (such as the PSE 102 in FIG. 1) may optionally apply a classification voltage in a range of 14 volts to 22 volts. The integrated circuit 118 may apply a voltage to the RCL pin 264 to bias the classification resistor 406 relative to the VNEG pin 260 to provide a classification signature to the PSE 102, specifying a power requirement of the powered device.

The PSE 102 provides an operating voltage in a range of 39 volts to 57 volts, and the integrated circuit 118 charges the soft-start capacitor 412 and enables the power loss indicator. Additionally, the integrated circuit 118 may activate the internal hot swap switch and the switching field effect transistor to supply power to the switching output (SWO) pin 278, thereby drawing current via the inductor 420 to provide a return path for current flow. The feedback (FB) pin 288 detects a voltage level across the resistor 418. The switch control circuit 248 may utilize the detected voltage to control the operation of the switching field effect transistor 246 to reduce or increase current flow via the inductor 420, thereby controlling the output voltage (Vout). The capacitor 422 serves as an output voltage filter.

Figure 5:
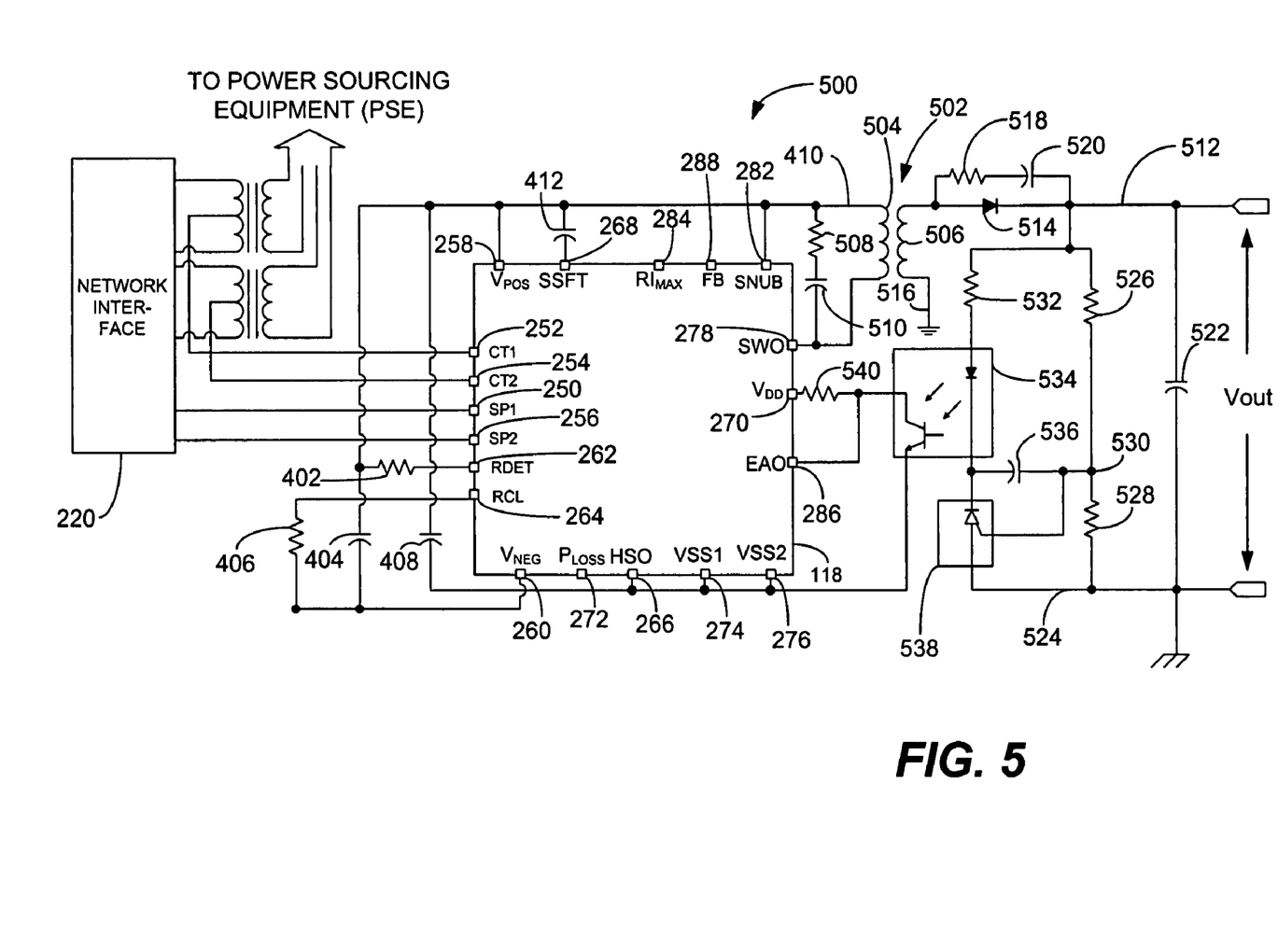
FIG. 5 is a circuit diagram of a particular illustrative embodiment of an integrated circuit of a powered device adapted to provide an isolated power supply to associated load circuitry.

FIG. 5 is a circuit diagram of a particular illustrative embodiment of an integrated circuit 118 of a powered device 500 adapted to provide an isolated power supply to associated load circuitry. The powered device 500 utilizes an external transformer 502, instead of a buck regulator configuration as in FIG. 4. In this embodiment, the RIMAX pin 284 is left floating to set the switching operation mode to an isolated switching mode, and the transformer 502 provides the isolation.

In general, the snubber pin 282 is coupled to the voltage supply terminal 410 to couple the SWO pin 278 via an integrated snubber circuit to the voltage protection circuit coupled to the VPOS pin 258 in response to an inductive voltage kick or flyback event detected at the SWO pin 278. The transformer 502 includes a primary winding 504 and a secondary winding 506 that is inductively coupled to the primary winding 504. The primary winding 504 is coupled to the voltage supply terminal 410 and to the SWO pin 278. A resistor 508 and a capacitor 510 are arranged in series with each other between the voltage supply terminal 410 and the SWO pin 278 and in parallel with the primary winding 504.

The secondary winding 506 is coupled between a first voltage supply terminal 512 via a diode 514 and is coupled to a second voltage supply terminal 516. A resistor 518 and a capacitor 520 are arranged in series and coupled between the secondary winding 506 and the first voltage supply terminal 512 in parallel with the diode 514. An output load capacitor 522 may be coupled between the first voltage supply terminal 512 and a third voltage supply terminal 524. A feedback resistor divider may be provided by resistors 526 and 528, which may be arranged in series. The resistor 526 may be coupled between the first voltage supply terminal 512 and a node 530 and the resistor 528 may be coupled between the node 530 and the third voltage supply terminal 524. A resistor 532 may be coupled between the first voltage supply terminal and an optically coupled isolator 534. The optically coupled isolator 534 may be coupled to the node 530 via a capacitor 536, to the third voltage terminal 524 via a low-voltage adjustable precision shunt regulator 538, to the VDD pin 270 via a resistor 540, and to the EAO pin 286.

In a particular illustrative non-limiting embodiment, the resistor 508 has a resistance value of approximately 33Ω with a tolerance of approximately 1% and a power rating of approximately ⅛th of a watt. The resistor 518 may be a 10Ω resistor with a tolerance of about 1% and a power rating of ⅛th of a watt. The capacitor 520 may have a capacitance of approximately 470 pF with a tolerance of about 10% and a power rating of 10 volts. The output load capacitor 522 may have a capacitance of approximately 470 pF with a tolerance of approximately 10% and a power rating of 10 volts. The resistors 526 and 528 may be 100 kΩ and 66.5 kΩ resistors, respectively, with a 1% tolerance and a power rating of ⅛th of a watt. The resistor 532 may be a 500Ω resistor with a tolerance of approximately 1% and a power rating of ⅛th of a watt. The capacitor 536 may have a capacitance of approximately 33 nF with a tolerance of approximately 10% and a power rating of approximately 5 volts. The resistor 540 may be a 10 kΩ resistor with a tolerance of approximately 10% and a power rating of approximately ⅛th of a watt.

In a particular illustrative non-limiting embodiment, the optically coupled isolator 534 may be a circuit device, such as the optically coupled isolator identified by part number PS2911 and manufactured by NEC Electronics, Inc. The low-voltage precision shunt regulator 538 may be a circuit device, such as the shunt regulator identified by part number TLV431 and produced by Texas Instruments Incorporated of Dallas Tex. In operation, the integrated circuit 118 may be adapted to provide an isolated 3.3 volt output across the voltage supply terminals 512 and 524 to power associated load circuitry.

In operation, after PoE detection and classification, the integrated circuit 118 begins receiving a voltage at a pair of inputs CT1 252 and CT2 254 or SP1 250 and SP2 256 that is between 39 volts and 57 volts, according to the PoE standard. The integrated circuit 118 provides a positive voltage supply to the voltage supply terminal 410, which is coupled to the primary winding 504. The switch control circuit 248 activates the switching field effect transistor 246 place a voltage on the switch output (SWO) pin 278 to bias the primary winding 504, which is inductively coupled to the secondary winding 506. A voltage is induced across the secondary winding 506 and applied to the voltage supply terminal 512 via the diode 514 and the resistor 518 and capacitor 520. The voltage on the voltage supply terminal 512 is isolated from the integrated circuit 518 via the transformer 502 in a forward path and by the optically coupled isolator 534 in a feedback path, thereby creating a voltage supply (Vout) across the voltage supply terminals 512 and 524 that is isolated from the integrated circuit 118.

In general, the integrated circuit 118 provide an integrated front-end for a powered device to comply with the PoE standard. The integrated circuit 118 includes diode bridges, a transient voltage surge suppressor, a PoE detection circuit, a PoE classification current source, and a dual-level hot swap current limiting switch. With these integrated components, the integrated circuit 118 may be connected directly to a network connector 220, such as an RJ-45 Ethernet connector, simplifying system design and enhancing reliability and voltage protection functionality. The integrated circuit 118 may be utilized in an isolated or non-isolated operational mode, using only four standard external components: the detection resistor 402, the optional classification resistor 406, the load capacitor 522, and the input capacitor 404. With these four components, the integrated circuit 118 may serve as a powered device interface that is fully compliant with the PoE standard.

In general, the integrated circuit 118 is adapted to operate with PSEs (such as the PSE 102 in FIGS. 1 and 2) that comply with the PoE standard and with legacy PSEs that do not adhere to the inrush current limits specified by the PoE standard, because it uses the two levels for the hot swap current limits. For example, the PoE standard specifies that if the powered device draws more than 350 mA for a time period that is greater than a threshold time, the powered device may be experiencing a failure and should shut down. Depending on the value of the switcher supply capacitor 408, the charge time of the switcher supply capacitor 408 may exceed the threshold time. Accordingly, the integrated circuit 118 may limit this initial current (in-rush current) to a level that is below 350 mA, such as below 150 mA. This allows the switcher supply capacitor 408 to charge up without concern that the duration of the charge period may cause a failure. Thus, by setting the initial inrush current limit to a low level, the integrated circuit 118 limits the current drawn from either a compliant or legacy PSE during start-up. After power up, the integrated circuit 118 may increase the current limit to allow the powered device to consume more power. In a particular embodiment, the integrated circuit 118 may allow the powered device to consume up to 12.95 watts.

In general, the inrush current limit specified by the PoE standard can generate high transient power dissipation in the powered device. By properly sizing the devices and by implementing on-chip thermal protection, the integrated circuit 118 can go through multiple turn-on sequences without overheating the package or damaging the device. The switching regulator power field effect transistor, such as the switching FET 246 in FIG. 2, may be designed and sized to withstand high peak currents created when converting a high-voltage, low-current supply into a low-voltage, high-current supply. Excessive power cycling or short circuit faults may trigger thermal overload protection to prevent the on-chip power field effect transistors from exceeding their safe and reliable operating range.

Figure 6:
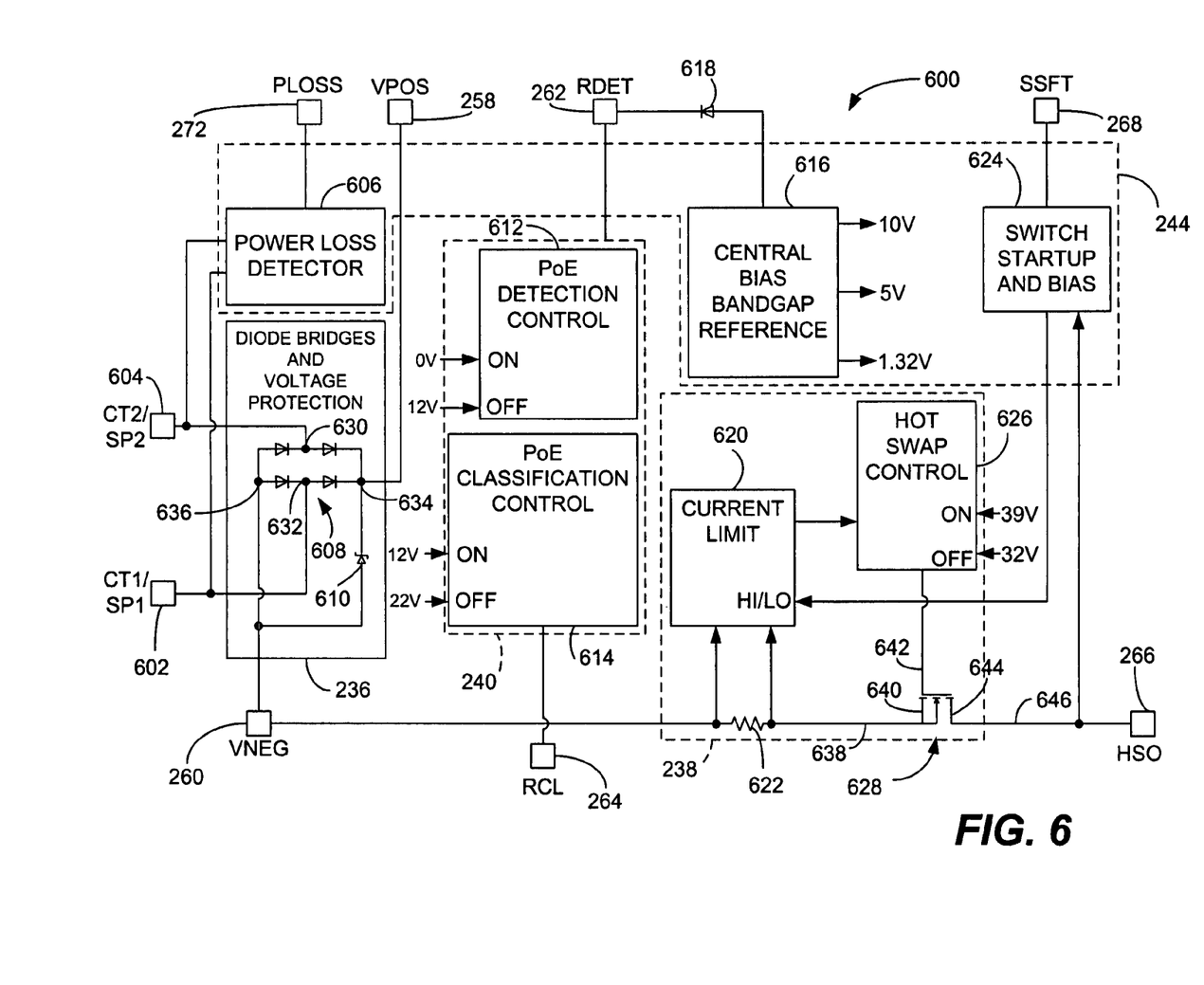
FIG. 6 is a block diagram of hot swap components of a particular illustrative embodiment of the integrated circuit with PoE functionality.

FIG. 6 is a block diagram of hot swap components of a particular illustrative embodiment of a portion 600 of the integrated circuit device 118 of FIGS. 1-5, including the diode bridges and voltage protection circuitry 236, the PoE detection and classification circuit 240, the hot swap switch and current limit 238, and the hot swap control and common bias circuit 244. The integrated circuit device 600 includes a first center tap (CT1)/first spare wire (SP1) pin 602 and a second center tap (CT2)/second spare wire (SP2) pin 604 responsive to a powered network via a network interface, such as an RJ-45 Ethernet connector. It should be understood that, in a particular embodiment, the CT1/SP1 pin 602 and the CT2/SP2 pin 604 may be provided as four separate pins, such as the pins 250, 252, 254, and 256 in FIGS. 2 and 3. The integrated circuit device 600 includes a power loss detector 606, diode bridges and voltage protection circuit 236 including a diode bridge 608 and an over-voltage protection element 610. The embodiment 600 also includes a detection and classification circuit 240, including a PoE detection control module 612, a classification control module 614, a central bias and bandgap reference module 616. The embodiment 600 also includes hot swap circuitry, including a diode 618, a current limit circuit 620, a resistor 622, a switcher startup and bias circuit 624, a hot swap control circuit 626, and a hot swap switch 628, which may be components of the hot swap switch and current limit circuit 238 and the hot swap control and common bias circuit 244 of FIG. 2.

As shown in FIG. 6, the power loss detector 606, the central bias and bandgap reference module 616, and the switch startup and bias module 624 may be included in the hot swap control and common bias circuit 244. The PoE detection control module 612 and the PoE classification control module may be included in the PoE detection and classification circuit 240. The current limit circuit 620, the hot swap control circuit 626, the resistor 622 and the hot swap switch 628 may be included in the hot swap switch and current limit circuit 238.

The diode bridge 608 includes a first input 630 coupled to the CT1/SP1 pin 602, a second input 632 coupled to the CT2/SP2 pin 604, a first output 634 coupled to the VPOS pin 258, and a second output 636 coupled to the VNEG pin 260. The over-voltage protection element 610 may be a zener diode designed to have a breakdown voltage that is greater than a normal operating range of the powered device (e.g. greater than approximately 57 volts) and that is less than a voltage rating of circuit components to be protected. The over-voltage protection element 610 may be coupled between the output 634 and the VNEG pin 260 to shunt excess voltage between the VPOS pin 258 and the VNEG pin 260 in response to detection of an over-voltage event. The PoE detection control module 612 is coupled to the RDET pin 262. The central bias bandgap reference module 616 is coupled to the RDET pin 262 via the diode 618. The classification control circuit module 614 is coupled to the RCL pin 264. The resistor 622 is coupled between the VNEG pin 260 and a voltage supply terminal 638. The current limit circuit 620 is coupled to the voltage supply terminal 638 and to the VNEG pin 260 across the resistor 622 to measure a current flow across the resistor 622. Additionally, the current limit circuit 620 is coupled to the hot swap control module 626 and to the switcher startup and bias module 624. The switch 628 includes a first terminal 640 coupled to the voltage supply terminal 638, a control terminal 642 that is coupled to the hot swap control module 626, and a second terminal 644 coupled to a second voltage supply terminal 646 and to the HSO pin 266. The switcher startup and bias module 624 is coupled to the second voltage supply terminal 646 and to the SSFT pin 268.

In general, the PoE standard defines an input voltage at the RJ-45 network interface of a PoE powered device with no reference to polarity. In other words, the powered device is expected to be able to accept power of either polarity at each of its inputs (e.g. CT1/SP1 pin 602 and CT2/SP2 pin 604). In a particular embodiment, two diode bridges may be used, where one diode bridge is coupled to an CT1 pin and an CT2 pin and the other diode bridge is coupled to an SP1 pin and an SP2 pin. The network interface (such as the network interface 220 in FIG. 2) may include transformer windings and the CT1/SP1 pin 602 and the CT2/SP2 pin 604 may be coupled to the respective center taps, depending on the implementation. Additionally, the PoE standard specifies that a powered device should be adapted to withstand a high voltage transient surge, such as a 1000 volt common-mode impulse with a 300 ns rise time and a 50 μs half-fall time.

By integrating the diode bridge 608 and the surge suppressor 610 into the integrated circuit device 600, the cost of the system and the overall design complexity may be reduced, since an external diode bridge and external surge suppressor are no longer needed. Moreover, by integrating the diode bridge 608 and the surge suppressor 610, the integrated circuit device 600 may monitor a voltage level at the input side of the diode bridge 608 using the power loss detector 606, instead of monitoring the voltage across a load capacitor (such as the load capacitor 422 in FIG. 4 or the load capacitor 522 in FIG. 5), thereby detecting an early indication of power loss. By detecting a power loss at the inputs, the integrated circuit device 600 may detect the power loss before the load capacitor discharges below the minimum operating voltage of 36 volts that is specified by the PoE standard, allowing the integrated circuit device 600 to initiate a controlled shutdown.

Additionally, integration of the surge suppressor 610 enables improved voltage clamping and protection. For example upon detection of a voltage fault condition, the surge suppressor 610 may actively disable the hot swap interface and switching regulator, thereby shutting off the switch 628 and preventing associated load circuitry (such as the load circuit 120 in FIG. 1) from encountering high-energy transients.

In operation, the PoE detection control module 612 is adapted to react to a voltage in a range of 2.8 volts to 10 volts received from a PSE (such as the PSE 102 in FIG. 1) during a PoE detection process. The PSE 102 applies the voltage and looks for a powered device signature indicative of a detection resistor that has a resistance of approximately 25.5 kΩ. The PoE detection control module 612 is adapted to connect an external resistor (such as the detection resistor 402 in FIG. 4) between the VPOS pin 258 and the VNEG pin 260 to alert the PSE that a valid powered device is present and is ready to receive a power supply. The hot swap switch 628 is disabled to prevent the switching regulator (such as the switch control circuit 248 in FIG. 2) and associated load circuitry (such as the load circuit 120 in FIG. 1) from creating errors in the detection signature.

Since the integrated circuit 118 includes the diode bridges 608, the integrated circuit 118 may bias the resistor 402 to compensate for voltage and resistance effects of the diode bridges. In general, the PoE standard specifies that the PSE should utilize a multi-point change in voltage over change in current $$\left(\frac{\Delta V}{\Delta I}\right)$$

measurement technique to remove a diode-induced DC offset from the signature resistance measurement. However, the PoE standard fails to address the non-linear resistance associated with the diodes within the diode bridge or the corresponding error induced in the signature resistor measurement. Since the diode resistance of the diode bridge 608, for example, appears in series with the detection signature resistor (such as the resistor 404 in FIG. 4), a signature resistor detection error may be introduced. The integrated circuit 600 may be adapted to compensate for this error. Since the diode bridges and protection 236 are integrated, the integrated circuit 118 can easily compensate for this error by offsetting resistance across various operating conditions using the PoE detection control module 612. Additionally, this functionality may be tested during automated testing of the integrated circuit 600 during the semiconductor fabrication design phase.

Under the PoE standard, once a PSE has detected a valid powered device, the PSE may classify the powered device for one of five power levels or classes, which are based on an expected power consumption of the powered device. This PoE classification process may be optional. An external resistor (such as the classification resistor 406 in FIG. 4) may be utilized to set a nominal classification current that can be read by the PSE to determine a power requirement of the powered device. When the PSE presents a fixed voltage between 15.5 volts and 20.5 volts to the CT1/SP1 pin 602 and the CT2/SP2 pin 604 of the integrated circuit 600, the PoE classification control module 614 may assert the class current from the VPOS pin 258 through the classification resistor (e.g. the classification resistor 406). In general, the classification resistor values and the corresponding power classifications are presented in TABLE 2 below.

TABLE 2

| Classification | Usage | Power Levels (Watts) | Nominal Class Current (mA) | RCL Resistor Value (1% tolerance and ⅛th of a Watt) |
| --- | --- | --- | --- | --- |
| 0 | Default | 0.44 to 12.95 | <4 mA | >1.33 kΩ or open circuit |
| 1 | Optional | 0.44 to 3.84 | 10.5 mA | 140 Ω |
| 2 | Optional | 3.84 to 6.49 | 18.5 mA | 75 Ω |
| 3 | Optional | 6.49 to 12.95 | 28 mA | 48.7 Ω |
| 4 | Reserved | Reserved | 40 mA | 34 Ω |

The PoE standard specifies a time limit of approximately 75 ms to perform the classification process in order to limit power dissipated in the powered device. If the PSE classification period exceeds 75 ms and the temperature of the integrated circuit 600 rises above the thermal shutdown limits, then the thermal protection circuit engages and disables the classification current to protect the integrated circuit 600. The integrated circuit 600 may remain in a classification mode until the input voltage exceeds 22 volts (an upper voltage boundary of the classification operation).

The PoE standard specifies that the powered device should turn on when the line voltage rises to a level of approximately 42 volts and should turn off when the line voltage falls below a level of approximately 30 volts. The powered device should also maintain an on-off hysteresis to prevent wiring losses between the PSE and the powered device from causing start-up oscillation. The integrated circuit 600 may include logic (such as the PoE control logic 242 in FIG. 2) to perform an under voltage lockout. For example, the PoE control logic 242 may monitor the line voltage at the inputs 630 and 632 and determine when to apply power to the integrated circuit switching regulator, such as the switch control circuit 248.

Before the power is applied to the switching regulator, the HSO pin 266 presents a high impedance and typically follows the voltage level of the VPOS pin 258 as the input at the CT1/SP1 and CT2/SP2 pins 602 and 604 is ramped (due to the discharged switcher supply capacitor, such as the capacitor 408 in FIG. 4). When the input voltage at the pins 602 and 604 rises above a turn-on voltage threshold, the switch supply capacitor begins to charge up under the control of the current limit circuit 620, and the HSO pin 266 transitions from a voltage potential of the VPOS pin 258 to the voltage level of the VNEG pin 260. Once the input voltage at the inputs 630 and 632 falls below 32 volts, the internal hot swap switch 628 is deactivated, and the HSO pin 266 transitions back to the voltage potential of the VPOS pin 258.

While the hot swap switch 628 is charging the switch supply capacitor (e.g. capacitor 408 in FIG. 4), the integrated circuit 600 maintains a low current limit. The switching regulator is disabled until a voltage across the hot swap switch 628 becomes low, indicating hat the switch supply capacitor 408 is charged. Once the switch supply capacitor 408 is charged, the hot swap control 626 activates the hot swap switch 628 and the current limit is increased. The current limit remains high until the input voltage at the inputs 630 and 632 of the diode bridge 608 fall below a turn off threshold or unless excessive power is dissipated in the hot swap switch 628. This dual current limit allows the integrated circuit 600 to be used with PSEs that comply with the PoE standard, as well as other PSEs that do not necessarily comply with the PoE standard.

In the event of a fault condition (e.g. when over 400 mA of current are drawn by the powered device, the voltage across the hot swap switch 628 may increase to clamp a maximum amount of power consumed by routing some of the power into an external capacitor, such as the capacitor 408. In general, the power dissipated by the hot swap switch 628 may be high. If the fault is caused by a low impedance, the voltage across the hot swap switch 628 may continue to rise until the lower current limit is engaged by the current limit circuit 620, further reducing the power dissipated. If the fault condition remains, thermal overload protection circuitry (not shown) may eventually engage and shut down the hot swap interface and switching regulator.

Since a function of the input supply capacitor (e.g. capacitor 404 in FIG. 4) across the VPOS pin 258 and the VNEG pin 260 is to maintain a voltage level, the input supply capacitor may be maintain the voltage during a power loss event. The input supply capacitor may provide hundreds of microseconds of an operating power supply level before the loss of power is detectable via the VPOS pin 258 and the VNEG pin 260. The power loss detector 606 may instantaneously detect the removal of a line voltage and provide an early warning signal to the powered device via the PLOSS pin 272. The PLOSS pin 272 may be an open drain output that pulls up to VPOS when a line voltage greater than 27 volts is applied. When the line voltage falls below 27 volts, the output of the PLOSS pin 272 may become high impedance, allowing an external pull-down resistor (such as the resistor 424 in FIG. 4) to change a logic state of the PLOSS pin 272. The powered device may include a microcontroller that can save its memory and/or its operational state before draining the supply capacitors and powering down.

FIG. 7 is a block diagram of a particular illustrative embodiment of a portion 700 of the integrated circuit 118 of FIGS. 1-5, including a portion of the current limiter circuit 238, the switch control circuit 248 and the switching field effect transistor (FET) 246. The integrated circuit portion 700 includes the SSFT pin 268, the FB pin 288, the EAO pin 286, the RIMAX pin 284, the SWO pin 278, the VSS1 pin 274, and the VSS2 pin 276. Additionally, the integrated circuit portion 700 includes an error amplifier 702, an oscillator 704, a pulse-width modulator 706, a current limiter 708, a switch drive 710, a transistor 712, and a resistor 714. The SSFT pin 268 and the FB pin 288 are coupled as inputs to the error amplifier 702, which includes an output coupled to the EAO pin 286 and to the pulse-width modulator 706. The pulse-width modulator 706 is adapted to receive an input from the oscillator 704, from the current limiter 706, and from the error amplifier 702 and to provide an output to the switch drive 710. The transistor 712 includes a first terminal coupled to the SWO pin 278, a control terminal 718 coupled to the switch drive 710, and a second terminal coupled to the resistor 714 via a first node 722. The current limiter 708 is coupled to the first node 722 and to a second node 724 on either side of the resistor 714. The current limiter is adapted to receive a mode selection input via the RIMAX pin 284. The VSS1 pin 274 and the VSS2 pin 276 are coupled to the second node 724.

In general, as shown in FIG. 7, the error amplifier 702, the oscillator 704, the pulse-width modulator 706, and the switch drive 710 may be included in the switch control circuit 248. The current limiter 708 may be included within the hot swap switch and current limit circuit 238. The switching FET 246 may selectively couple the pin 278 to the VSS1 pin 274 and the VSS2 pin 276 via the resistor 714.

Additionally, the integrated circuit portion 700 may include a snubber circuit 726 coupled between the snub pin 282 and the VPOS pin 258. The snubber circuit 726 may include a diode 728 including a cathode terminal coupled to the VPOS pin 258 and including an anode terminal. The snubber circuit 726 may also include a breakdown diode 730 including a cathode terminal coupled to the snub pin 282 and an anode terminal coupled to the anode terminal of the diode 728. The snubber circuit 726 prevents current flow from the VPOS pin 258 to the snub pin 282, while allowing a high voltage at the snub pin 282 to be directed back to the VPOS pin 258, which may result in directing high voltage transients away from the switching FET 238 to over-voltage protection circuitry, such as the zener diode 610 in FIG. 6.

In operation, the integrated circuit portion 700 provides a constant frequency, pulse-width modulated controller integrated with a switching power transistor 712. Once the hot swap interface has determined that there is a proper turn-on of the switching regulator controller (e.g. switch control circuit 248), the switch drive 710 and the switching FET 246 are fully operational to selectively activate and deactivate a power supply to the VSS1 pin 274 and the VSS2 pin 276. An internal free-running oscillator input from the oscillator 704 and an internal voltage reference from the current limiter 708 may be provided to the pulse-width modulator 706. The output of the error amplifier (either internal for non-isolated applications or external for isolated applications) is provided to the pulse-width modulator 706.

The pulse-width modulator 706 controls the switch drive 710. By integrating the transistor 712 into the same integrated circuit as the controller (e.g. the error amplifier 702, the pulse-width modulator 706, the oscillator 704, the switch drive 710, and the current limiter 708), the controller has the ability to adjust drive strength, timing and efficiency of the gate of the transistor 712. The current limiter 708 prevents the switching transistor 712 from sinking too much current, dissipating too much power, and being damaged. Thermal overload protection may provide a secondary level of protection.

In general, PoE applications fall into broad categories of isolated and non-isolated systems. Non-isolated systems (such as the powered device shown in FIG. 5) can be utilized when a powered device is self-contained and does not provide external conductors to the user or to another application. Non-isolated PoE applications may include wireless access points, security cameras, and the like. In this type of application, there is no explicit need for a DC isolation (e.g. a DC-to-DC transformer) between the switching regulator output and the hot swap interface. An isolated PoE system (such as the powered device shown in FIG. 5) may be used when the powered device interfaces with other self-powered equipment or has external conductors that are accessible to the user or to other applications. For proper operation, the regulated output supply of the switching regulator should not have a DC electrical path to the hot swap interface or to the primary winding (such as the winding 504 in FIG. 5) of the transformer. Isolated applications may include point-of-sale terminals, for example, where a user may touch the grounded metal chassis.

The particular implementation may determine the converter topology (e.g. isolated versus non-isolated). An isolated application may use a flyback, transformer based topology (such as that shown in FIG. 5) while a non-isolated application may utilize an inductor-based buck converter topology.

In general, though the embodiments described above have focused largely on PoE implementations, it should be understood that the integrated circuit 118 may be utilized in other applications and with other types of powered networks where power and data may be derived from the same cable. For example, diode bridges may be used to rectify a voltage supply from a bus including power and data, and a power protection element may be utilized to shunt excess current and voltage between input supply terminals to provide fault protection to associated circuitry. In some embodiments, the wiring that couples the powered network to the powered device may include a plurality of individual wires, such as twisted pair cabling. In such instances, a pair of individual wires may carry both power and data. Alternatively, a first pair of the individual wires may carry data and a second pair of the individual wires may carry a supply voltage. In another embodiment, the wiring may include a power bus that carries both power and data. In another embodiment, the wiring may include a coaxial cable that carries both power and data.

Additionally, though the above-described embodiments were directed to an application that is compliant with the IEEE Std 802.3™-2005 clause 33 standard (e.g. the PoE standard), it is understood and expected that such standards may change over time. It should be understood that the PoE compatible circuit described above with respect to FIGS. 1-7 may be used in other power/data network applications. Moreover, it is contemplated that the PoE standard may change and that newer versions of the PoE standard may be promulgated.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A powered device comprising:
   an interface responsive to a powered network;
   a transformer circuit including first and second terminals; and
   an integrated circuit coupled to the interface to receive a power supply and data from the powered network, the integrated circuit comprising:
      positive and negative power supply terminals, the positive power supply terminal coupled to the first terminal of the transformer circuit;
      a power rectification device including first and second inputs coupled to the interface to receive the power supply and configured to generate a rectified power supply related to the power supply and to provide the rectified power supply to the positive and negative power supply terminals;
      a switching regulator to selectively provide the rectified power supply to associated load circuitry;
      an over-voltage protection circuit coupled between the positive and negative power supply terminals, the over-voltage protection circuit configured to detect an over-voltage condition;
      a power over Ethernet (PoE) controller configured to control the switching regulator to provide the power supply to the associated load circuitry when the rectified power supply is within an operating range and to provide a shut down signal to deactivate the switching regulator when the over-voltage condition is detected; and
      a power loss detector coupled to the first and second inputs of the power rectification device and configured to provide a power level indication signal to the PoE controller when a voltage potential between the first and second inputs falls below a first threshold or exceeds a second threshold.

2. The powered device of claim 1, wherein the integrated circuit device is connected directly to the interface.

3. The powered device of claim 1, wherein the switching regulator comprises a transistor to control current flow to a buck regulator.

4. The powered device of 1, wherein the switching regulator comprises a transistor to control a primary winding of a transformer.

5. The powered device of claim 1, wherein the interface comprises an Ethernet RJ-45 connector.

6. The powered device of claim 1, wherein the PoE controller comprises a PoE protocol circuit device adapted to detect a PoE detection process and to provide a PoE detection signature to the powered network in response to the PoE detection process.

7. The powered device of claim 1, wherein the PoE controller comprises a PoE classification device to detect a PoE classification process and to provide a PoE power signature to the powered network in response to the PoE classification process.

8. An integrated circuit device of a Power over Ethernet (PoE) powered device, the integrated circuit device including an integrated circuit comprising:
  a power circuit device responsive to a powered network and including first and second inputs to receive a power supply, the power circuit device configured to generate a rectified power supply related to the power supply and to provide the rectified power supply to first and second supply terminals, the power circuit device including an over-voltage detection circuit coupled between the first and second supply terminals to detect an over-voltage event;
  an integrated hot swap switch coupled to the power circuit device to detect the powered network and to selectively activate current to a supply terminal in response to detection of the powered network;
  a switching regulator comprising a switching regulator driver and a switching regulator controller to selectively activate a switch to provide a regulated power supply to a pair of supply terminals, the switching regulator controller configured to selectively deactivate the switch in response to detection of the over-voltage event; and
  a PoE detection and classification circuit coupled to the power circuit device to generate a detection signature in response to a PoE detection process and generate a classification signature responsive to a PoE classification process; and
  a power loss detector coupled to the first and second inputs, the power loss detector to monitor the power supply and to apply power to the switching regulator when an input voltage exceeds a predetermined threshold voltage.

9. The integrated circuit device of claim 8, wherein the power circuit device is connected to an RJ-45 connector.

10. The integrated circuit device of claim 8, wherein the switching regulator further comprises the switch, and wherein the switch is coupled to a primary winding of a transformer to control current flow through the primary winding and to indirectly control current flow to a load circuit via a secondary winding of the transformer.

11. The integrated circuit device of claim 8, wherein the device classification circuit is programmable.

12. The integrated circuit device of claim 8, further comprising:
  a dual current limiter to detect a power level of the power supply and to deactivate a current flow when the power level falls below an on-threshold and when the power level exceeds a power threshold.

13. The integrated circuit device of claim 8, further comprising a power loss detector to detect a power loss event at an input of the power circuit device and to provide a power loss indicator.

14. An integrated circuit comprising:
  at least one diode bridge responsive to a powered network to receive an input supply voltage and to generate a rectified output supply voltage related to the input supply voltage;
  an over-voltage protection device coupled to the at least one diode bridge to detect a voltage level of the rectified output supply voltage and to clamp the output supply voltage when the voltage level exceeds a threshold;
  a switching regulator coupled to the at least one diode bridge to provide a regulated supply voltage;
  a power loss detector coupled to the powered network to monitor the input supply voltage and to provide a power level indication when an input voltage exceeds a predetermined threshold voltage;
  a controller coupled to the over-voltage protection device and to the switching regulator, the controller to monitor the output supply voltage and to transmit a control signal to activate the switching regulator when the output supply voltage is appropriate for the switching regulator and to deactivate the switching regulator when the over-voltage condition is detected; and
  a network interface coupled to first and second input terminals of the at least one diode bridge and to an Ethernet cable, the network interface to transfer a Power over Ethernet supply voltage to first and second input terminals of the diode bridge.

15. The integrated circuit of claim 14, wherein the switching regulator comprises a buck regulator configuration to produce the regulated output supply voltage.

16. The integrated circuit of claim 15, wherein the switching regulator further comprises an inductor connected to a first output terminal of the buck regulator configuration.

17. The integrated circuit of claim 16, wherein the buck regulator configuration further comprises an output capacitor coupled between a second output terminal of the buck regulator and the first output terminal.

18. The integrated circuit of claim 14, wherein the control signal comprises a shut down signal.

* * * * *